United States Patent [19]

Rigsby et al.

[11] Patent Number: 5,621,699

[45] Date of Patent: Apr. 15, 1997

[54] APPARATUS AND METHOD OF CALIBRATING VERTICAL PARTICLE VELOCITY DETECTOR AND PRESSURE DETECTOR IN A SEA-FLOOR CABLE WITH IN-SITU PASSIVE MONITORING

[75] Inventors: Timothy B. Rigsby, Fulshear; Joe I. Sanders, Sugarland, both of Tex.

[73] Assignee: PGS Ocean Bottom Seismic, Inc., Houston, Tex.

[21] Appl. No.: 499,764

[22] Filed: Jul. 7, 1995

[51] Int. Cl.⁶ .................................................. G01V 1/38
[52] U.S. Cl. .............................. 367/22; 367/24; 364/421
[58] Field of Search ................................ 367/13, 22, 24; 364/421, 582; 395/2.33, 2.43

[56] References Cited

U.S. PATENT DOCUMENTS

| | | |
|---|---|---|
| 2,757,356 | 7/1956 | Haggerty . |
| 2,923,367 | 2/1960 | Cox . |
| 3,290,645 | 12/1966 | Pavey, Jr. et al. . |
| 3,299,397 | 1/1967 | Pavey, Jr. et al. . |
| 3,343,626 | 9/1967 | Sparks . |
| 3,350,683 | 10/1967 | Senobush . |
| 3,689,874 | 9/1972 | Foster et al. . |
| 3,943,484 | 3/1976 | Balderson . |

(List continued on next page.)

FOREIGN PATENT DOCUMENTS

| | | |
|---|---|---|
| 1316479 | 11/1970 | United Kingdom . |
| 2004648 | 4/1979 | United Kingdom . |
| 2030400 | 4/1980 | United Kingdom . |

OTHER PUBLICATIONS

Dragoset et al, 64th Annu. SEG Int. Mtg, Oct. 23, 1994, pp. 857–860; abst. only herewith.

Monk et al, 56th EAEG Mtg., Jun. 6, 1994, 2 pp; abst. only herewith.

Washburn and Wiley, "The Effect of the Placement of a Seismometer on its Response Characteristics," presented at the Annual Meeting, Chicago, Apr. 11, 1940.

Backus, "Water Reverberations—Their Nature and Elimination," Geophysics, vol. 24, No. 2, Apr. 1959, pp. 233–261.

(List continued on next page.)

Primary Examiner—Nelson Moskowitz
Attorney, Agent, or Firm—Gordon T. Arnold

[57] ABSTRACT

A method of processing data from a co-located hydrophone-geophone pair of seismic receivers of an ocean-bottom cable system. Ambient noise is obtained for the hydrophone and geophone. A relative noise signal is determined by finding the normalized difference between geophone and hydrophone noise signals. Geophone and hydrophone data signals are then scaled by an amount equal to the relative noise signal.

20 Claims, 4 Drawing Sheets

U.S. PATENT DOCUMENTS

| | | |
|---|---|---|
| 3,979,713 | 9/1976 | Parrack . |
| 4,134,097 | 1/1979 | Cowles . |
| 4,146,871 | 3/1979 | Ruehle . |
| 4,234,938 | 11/1980 | Allen et al. . |
| 4,253,164 | 2/1981 | Hall, Jr. . |
| 4,296,481 | 10/1981 | Weiss . |
| 4,348,749 | 9/1982 | Galbraith, Jr. . |
| 4,380,059 | 4/1983 | Ruehle . |
| 4,437,175 | 3/1984 | Berni . |
| 4,449,208 | 5/1984 | Moeckel et al. . |
| 4,477,887 | 10/1984 | Berni . |
| 4,486,865 | 12/1984 | Ruehle . |
| 4,520,467 | 5/1985 | Berni ......................................... 367/21 |
| 4,581,724 | 4/1986 | Zachariadis . |
| 4,622,519 | 11/1986 | Goldman ................................. 328/137 |
| 4,644,507 | 2/1987 | Ziolkowski . |
| 4,644,508 | 2/1987 | Zachariadis . |
| 4,658,387 | 4/1987 | Dolengowski et al. . |
| 4,685,090 | 8/1987 | Krevor . |
| 4,733,379 | 3/1988 | Lapetina et al. . |
| 4,736,345 | 4/1988 | Keckler et al. . |
| 4,752,916 | 6/1988 | Loewenthal . |
| 4,794,572 | 12/1988 | Sondergeld et al. . |
| 4,803,666 | 2/1989 | Alford . |
| 4,817,061 | 3/1989 | Alford et al. . |
| 4,821,241 | 4/1989 | Berglund . |
| 4,888,743 | 12/1989 | Thomsen . |
| 4,903,244 | 2/1990 | Alford . |
| 4,910,716 | 3/1990 | Kirlin et al. . |
| 4,912,979 | 4/1990 | Sondergeld et al. . |
| 4,933,913 | 6/1990 | Thomsen . |
| 4,935,903 | 6/1990 | Sanders . |
| 4,937,793 | 6/1990 | Shuck et al. . |
| 4,956,822 | 9/1990 | Barker et al. . |
| 4,979,150 | 12/1990 | Barr . |
| 4,992,993 | 2/1991 | Chambers . |
| 5,027,332 | 6/1991 | Alford . |
| 5,029,146 | 7/1991 | Alford . |
| 5,136,554 | 8/1992 | Thomsen et al. . |
| 5,163,028 | 11/1992 | Barr et al. . |
| 5,181,171 | 1/1993 | McCormack et al. .................. 364/421 |
| 5,235,554 | 8/1993 | Barr et al. ................................. 367/13 |
| 5,251,183 | 10/1993 | McConnell et al. . |
| 5,257,241 | 10/1993 | Henderson et al. . |
| 5,365,492 | 11/1994 | Dragoset ................................... 367/21 |
| 5,396,472 | 3/1995 | Paffenholz . |
| 5,442,591 | 8/1995 | Dragoset et al. ......................... 367/22 |

OTHER PUBLICATIONS

Schneider and Backus, "Ocean–Bottom Seismic Measurements Off the California Coast," 69 Journal of Geophysical Research, No. 6, Mar. 15, 1964, pp. 1135–1143.

White, "Seismic Wave Radiation—Transmission and Attenuation," Chapter 2: Plane Waves, Mc Graw Hill, 1965, pp. 15–41.

Widrow, et al., "Adaptive Noise Canceling: Principles and Applications," Proceedings of the IEEE, vol. 63, No. 12, Dec. 1975.

Ziolkowski, et al., "Wavelet Deconvolution Using a Source Scaling Law," Geophysical Prospecting, vol. 28, 1980, pp. 872–901.

Hoover and O'Brien, "The Influence of the planted Geophone on Seismic Land Data," Geophysics, vol. 45, No. 8, Aug. 1980, pp. 1229–1253.

Ziolkowski, "Source Array Scaling for Wavelet Deconvolusion," Geophysical Prospecting, vol. 28, 1980, pp. 902–918.

Treitel, et al., "Plane–wave Decomposition of Seismograms," Geohpysics, vol. 47, No. 10, Oct. 1982, pp. 1375–1401.

Krohn, "Geophone Ground Coupling," Geohpysics, vol. 49, No. 6, Jun. 1984, pp. 722–731.

Lowenthal, et al., "Deterministic Estimation of a Wavelet Using Impedance Type Technique," Geophysical Prospecting, vol. 33, 1985, pp. 956–969.

Krohn, "Geophone Ground Coupling," Geophysics: The Leading Edge of Exporation, Apr. 1985, pp. 56–60.

Bell et al., "Two–Trace Directional Filter for Processing . . . , " published by Society of Exploration Gelophysicists, 1987 annual conference, pp. 768–769.

Tan, "Reciprocity theorem applied to the geophone ground coupling problem," Geophysics, vol. 52, No. 12, Dec. 1987, pp. 1715–1717.

Brink, "Marine Sesimic Exploration Using Vertical Receiver Arrays . . . " 49th Meeting of European Assn. of Exploration Geophysicists, Jun. 1987.

Brink, "Application of Vertical Reciever Arrays in 3–D . . . , " published by Society of Exploration Geophysicists, 1988 annual conference, pp. 460–463.

Monk, "Wavefield Separation of Twin Streamer Data," First Break, vol. 8, No. 3, Mar. 1988.

Bell, et al., "Two–Trace Directional Filter for Prcessin Offset Vertical Seismic Profiles," AAPG Bulletin, vol. 72, No. 3, Mar. 1988, p. 375.

Wuenschel, "Removal of the detector–ground coupling effect in the vertical seismic profiling environment," vol. 53, No. 3, Mar. 1988, pp. 359–364.

APPARATUS AND METHOD OF CALIBRATING VERTICAL PARTICLE VELOCITY DETECTOR AND PRESSURE DETECTOR IN A SEA-FLOOR CABLE WITH IN-SITU PASSIVE MONITORING

BACKGROUND OF THE INVENTION

This invention relates to the art of seismic data processing of data obtained from co-located pressure sensor and particle velocity sensors. More particularly, the present invention relates to removal of ghosting caused by water-column reverberation with such data.

For many years, "dual sensors" or co-located hydrophones and geophones have been used in seismic bottom-cable applications (as used herein, the term "hydrophone" is a synonym for a pressure sensor and "geophone" is a synonym for a particle velocity detector). Many have used the differing properties between the hydrophone and a geophone to effect wavefield separation, wherein the upgoing wavefield on the two sensors is equal while the downgoing wavefield is opposite in polarity. Thus, by adding the wavefields, the downgoing wavefield is canceled and the upgoing wavefield is retained. For example, see Ruehle, U.S. Pat. No. 4,486,865, issued Dec. 4, 1984 to William Ruehle, and incorporated herein by reference; U.S. Pat. No. 4,979,150, issued to Frederick Barr on Dec. 18, 1990, also incorporated herein by reference; U.S. Pat. No. 5,163,028, issued to Frederick Barr, et al. on Nov. 10, 1992, incorporated herein by reference; U.S. Pat. No. 5,235,554, issued to Frederick Barr, et al. on Aug. 10, 1993, and incorporated herein by reference; and U.S. Pat. No. 5,365,492, issued to William Dragoset on Nov. 15, 1994, also incorporated herein by reference. As recognized in the above-cited references, the problem of "water-column reverberation" continues to cause problems in the use of co-located hydrophone-geophone pairs. Each has problems and use relatively complex methods for eliminating water-column reverberation and the imperfect coupling between the geophone and the seabed floor.

None of the above-references, however, succeed in true matching of the hydrophone and geophone signals. One attempt of reverberation elimination failed to recognize the inherent similarities of the wavelet. Another solution involved firing a "calibration" shot. This method was imperfect because it was sensitive to the position of the wave source relative to the receiver. In order for the calibration to be effective, the wave source must be positioned directly above the receiver. Such a position is practically difficult to obtain. A later method presents a solution to the positioning problem which arises from "calibration" of the wave source, but then failed to consider changes in geologic and ambient characteristics of the subsurface reflections.

Accordingly, it is an object of this invention to combine hydrophone and geophone signals while eliminating the errors found in previous attempts at eliminating water-column reverberation. It is also an object of the invention to avoid the need for making a calibration shot after the cable has been laid. Further, it is an object of the invention to observe water-column reverberation without the need for experimental observation that is subject to the position of the calibration shot relative to the hydrophone/geophone pair. Further still, it is an object of the invention to eliminate water-column reverberation in a manner that is not susceptible to changing reflections and coupling characteristics of the sea-floor.

SUMMARY OF THE INVENTION

According to one aspect of the invention, a method of processing data from a co-located hydrophone-geophone pair of seismic receivers is provided. The method comprises: obtaining a geophone noise signal that represents ambient noise for the geophone (for example, by direct detection or by use of a recording of such noise); obtaining a hydrophone noise signal that represents ambient noise for the hydrophone; generating a normalized relative noise signal that is the normalized difference between the geophone noise signal and the hydrophone noise signal; and adjusting the relative amplitude between the data from the hydrophone and the data from the geophone by a function dependant upon the normalized relative noise signal.

According to a more specific embodiment, the adjusting comprises multiplying at least one of the hydrophone or geophone data signals by a value. And, the process further comprises: creating a reflected seismic wavefield in a water environment; obtaining a geophone data signal for the geophone that represents waves from the reflected seismic wavefield; obtaining a hydrophone data signal for the hydrophone that represents waves from the reflected seismic wavefield; and combining the scaled geophone and hydrophone data signals together to form a combined signal trace, wherein the combining comprises a linear combination of the hydrophone and geophone data.

According to an alternative embodiment, the process further comprises: passband filtering the geophone noise signal and the hydrophone noise signals, wherein a set of narrowband geophone noise signals and a set of narrowband hydrophone noise signals is defined, and wherein the adjusting comprises adjusting the relative amplitude between corresponding narrowbands of the sets of narrowband hydrophone and geophone signals.

The above and other objects of the invention are accomplished, according to another aspect of the present invention, in which an apparatus is provided for obtaining and processing data from a co-located hydrophone-geophone pair of seismic receivers in an ocean-bottom cable, wherein the data comprises: an ambient noise signal for the pair representing ambient noise for the geophone, an ambient noise signal for the pair representing ambient noise for the hydrophone, a geophone data signal for the geophone, and a hydrophone data signal for the hydrophone. The apparatus determines a normalized relative noise signal derived from the ambient noise signals. The apparatus then applies the normalized relative noise signal to the data signals so as to suppress multiple reverberations in the data signals.

Another embodiment of the invention is a process wherein a relative noise signal is obtained by determining the difference between the geophone noise signal and the hydrophone noise signal and then normalizing the difference. The geophone data signal and the hydrophone data signal are scaled by an amount equal to the normalized relative noise signal and then combined.

In another embodiment of the present invention, there is a process wherein a relative noise signal is obtained by first normalizing both the geophone noise signal and the hydrophone noise signal and second, determining the difference between the normalized signals. The geophone data signal and the hydrophone data signal are scaled by an amount equal to the normalized relative noise signal and then combined.

DESCRIPTION OF THE DRAWINGS

For a more complete understanding of the present invention and for further advantages thereof, reference is made to the following Detailed Description taken in conjunction with the accompanying drawings, in which.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
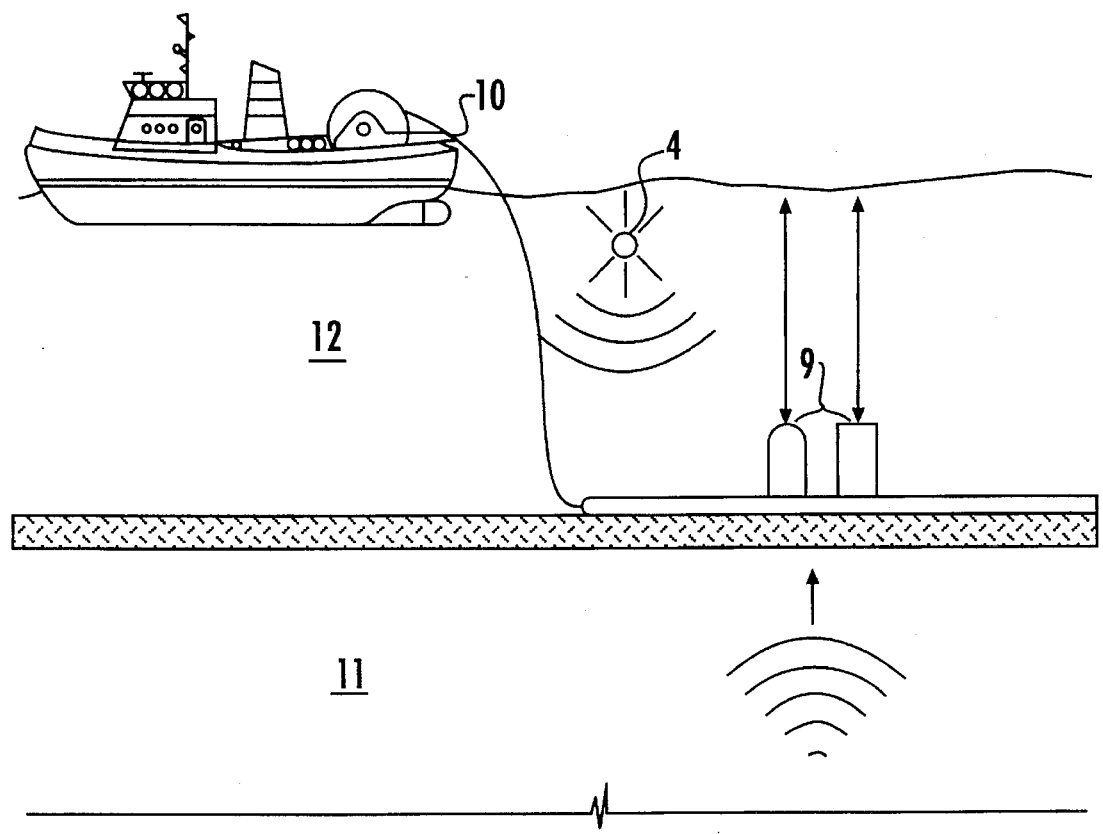
FIG. 1 is a representative view which describes another embodiment of present invention for surveying subterranean strata beneath a body of water that employs a co-located hydrophone-geophone pair of seismic receivers of an ocean-bottom cable system.
Figure 2:
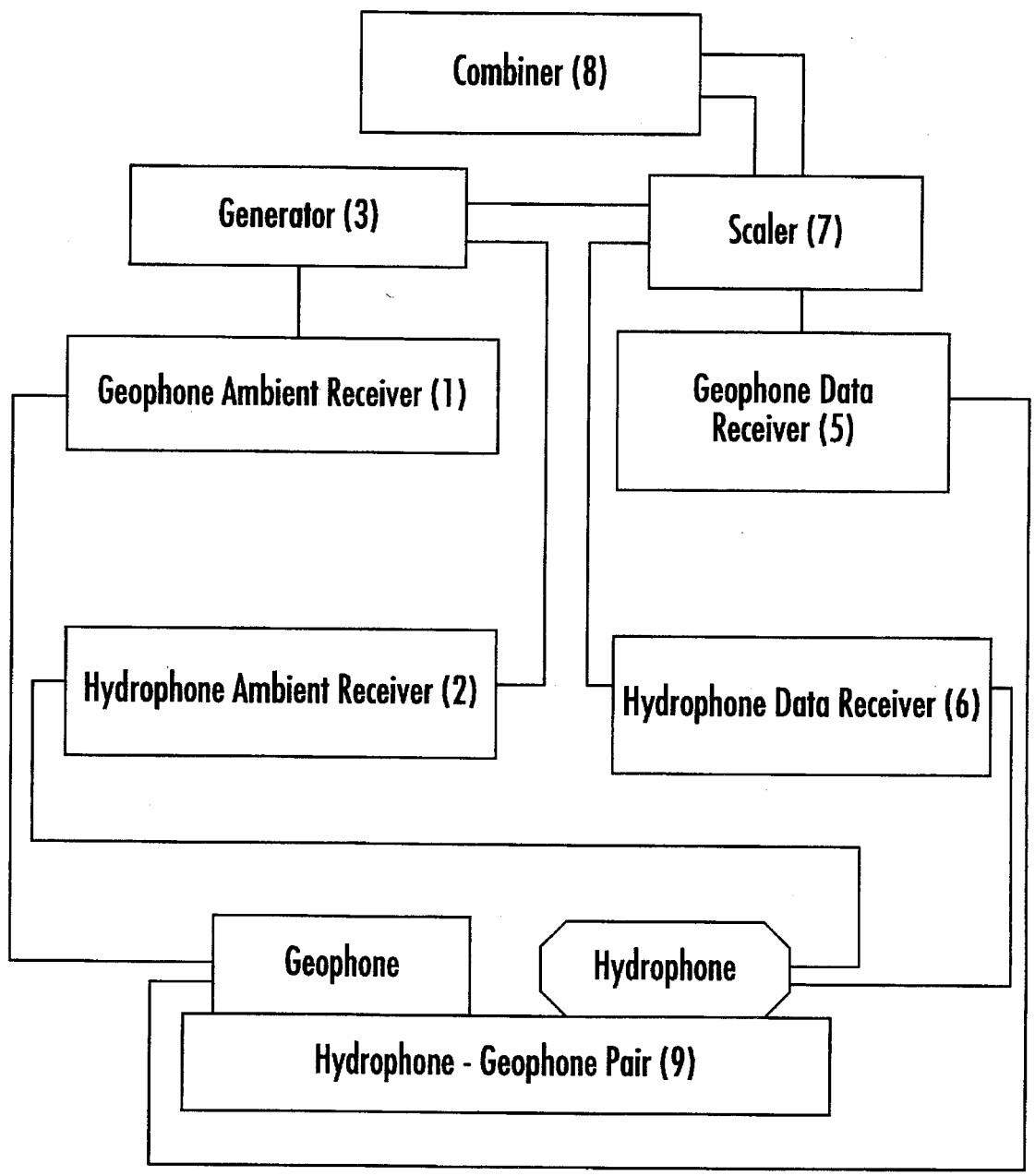
FIG. 2 is a schematic of an example embodiment of a system provided by the present invention for obtaining and processing data from a hydrophone-geophone pair of seismic receivers in an ocean-bottom cable system.

According to one example embodiment of the invention, as illustrated in FIGS. 1 and 2, there is provided an apparatus for surveying subterranean strata (11) beneath a body of water (12) that employs a co-located hydrophone-geophone pair (9) of seismic receivers of an ocean-bottom cable system (10). The apparatus comprises: a geophone ambient receiver (1) of an ambient noise signal for the geophone; a hydrophone ambient receiver (2) of an ambient noise signal for the hydrophone; a generator (3) of a normalized relative noise signal, representing the difference between the geophone noise signal and the hydrophone noise signal; a wave generator (4) of a reflected seismic wavefield in a water environment; a geophone data receiver (5) of a geophone data signal for the geophone; a hydrophone data receiver (6) of a hydrophone data signal for the hydrophone; a scaler (7) of the geophone data signal and the hydrophone data signal by an amount equal to the normalized relative noise signal; and a combiner (8) of the scaled geophone and hydrophone data signals that forms a combined signal trace. The apparatus receives information about the environmental noises ambient to the hydrophone-geophone pair. This information is used to calibrate the relative sensitivity of the pair to the effect of the sea-floor on downgoing energy. The effects are usually due to coupling of the geophone and sea-floor reflectivity.

According to another aspect of the invention, a method of processing data from a co-located hydrophone-geophone pair of seismic receivers is provided. The method comprises: obtaining a geophone noise signal that represents ambient noise for the geophone (for example, by direct detection or by use of a recording of such noise); obtaining a hydrophone noise signal that represents ambient noise for the hydrophone; generating a normalized relative noise signal that is the normalized difference between the geophone noise signal and the hydrophone noise signal; and adjusting the relative amplitude between the data from the hydrophone and the data from the geophone by a function dependant upon the normalized relative noise signal.

According to a more specific embodiment, the adjusting comprises multiplying at least one of the hydrophone or geophone data signals by a value. And, the process further comprises: creating a reflected seismic wavefield in a water environment; obtaining a geophone data signal for the geophone that represents waves from the creating a reflected seismic wavefield; obtaining a hydrophone data signal for the hydrophone that represents waves from the creating a reflected seismic wavefield; and combining the scaled geophone and hydrophone data signals together to form a combined signal trace, wherein the combining comprises a linear combination of the hydrophone and geophone data.

According to an alternative embodiment, the process further comprises: passband filtering the geophone and hydrophone noise signals, wherein a set of narrowband geophone noise signals and a set of narrowband hydrophone noise signals is defined, and wherein the adjusting comprises adjusting the relative amplitude between corresponding narrowbands of the sets of narrowband hydrophone and geophone signals.

In one example of acceptable methods used with the above-described system, an ocean-bottom cable system is used, although co-located pairs of geophone and hydrophone sensors are used according to alternative embodiments in non-bottom cables, and it is believed that such dual sensor pairs are useful according to the present invention in vertical seismic prospecting applications, as well. One useful method comprises: obtaining a geophone noise signal that represents ambient noise for the geophone; obtaining a hydrophone noise signal that represents ambient noise for the hydrophone; generating a normalized relative noise signal that is the normalized difference between the geophone noise signal and the hydrophone noise signal; creating a reflected seismic wavefield in a water environment; obtaining a geophone data signal for the geophone that represents waves from the creating a reflected seismic wavefield; obtaining a hydrophone data signal for the hydrophone that represents waves from the creating a reflected seismic wavefield; scaling the geophone and hydrophone data signals by a scale amount equal to the normalized relative noise signal; and combining the scaled geophone and hydrophone data signals together to form a combined signal trace.

Figure 3:
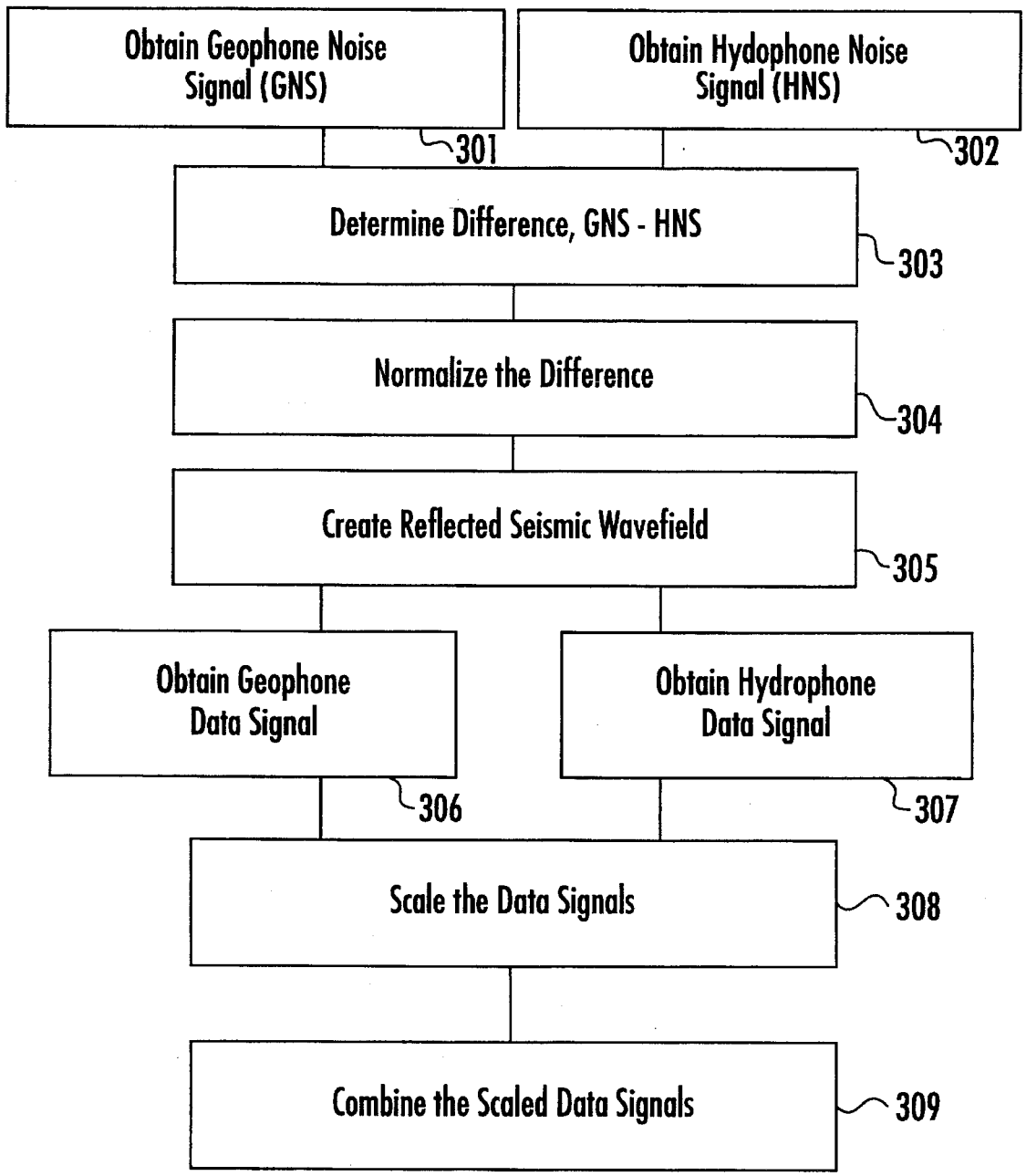
FIG. 3 is a flowchart which outlines one embodiment of a method of processing data from a co-located hydrophone-geophone pair of seismic receivers in an ocean-bottom cable system.

According to another example embodiment of the invention, as illustrated in FIG. 3, there is provided a method of processing data from a co-located hydrophone-geophone pair of seismic receivers of an ocean-bottom cable system. The method comprises: obtaining a geophone noise signal that represents ambient noise for the geophone (301); obtaining a hydrophone noise signal that represents ambient noise for the hydrophone (302); determining a difference between the geophone noise signal and the hydrophone noise signal (303); determining a normalized value for the difference, whereby the normalized relative noise signal is defined (304); creating a reflected seismic wavefield in a water environment (305); obtaining a geophone data signal for the geophone that represents waves from the reflected seismic wavefield (306); obtaining a hydrophone data signal for the hydrophone that represents waves from the reflected seismic wavefield (307); scaling the geophone and hydrophone data signals by a scale amount equal to the normalized relative noise signal (308); and combining the scaled geophone and hydrophone data signals together to form a combined signal trace (309).

Figure 4:
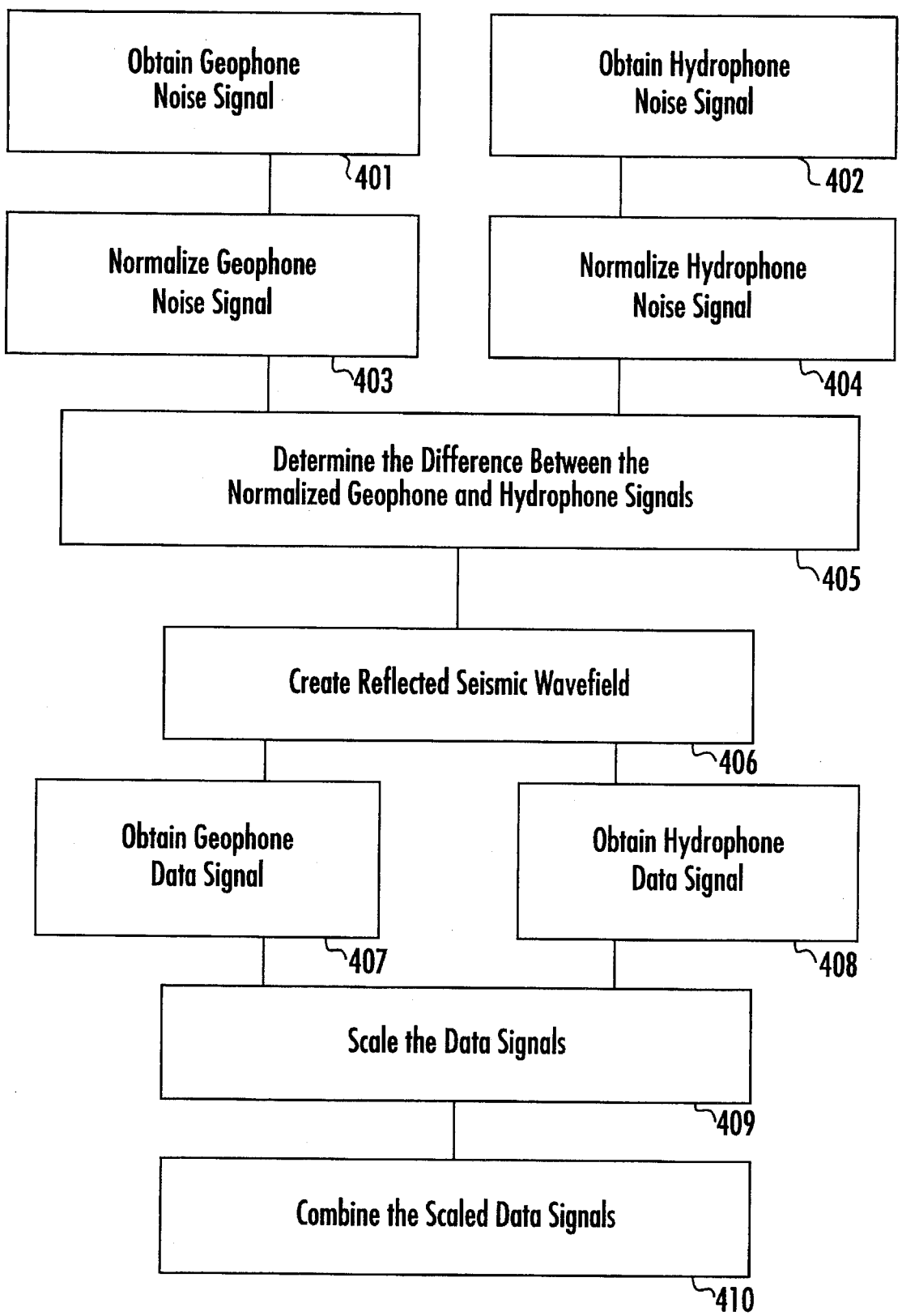
FIG. 4 is a flowchart which outlines another method of processing data from a co-located hydrophone-geophone pair of seismic receivers in an ocean-bottom cable system.

According to another example embodiment of the invention, as illustrated in FIG. 4, there is provided a method of processing data from a co-located hydrophone-geophone pair of seismic receivers of an ocean bottom cable system. The method comprises: obtaining a geophone noise signal that represents ambient noise for the geophone (401);

obtaining a hydrophone noise signal that represents ambient noise for the hydrophone (402); determining a geophone normalized value of the geophone noise signal (403); determining a hydrophone normalized value of the hydrophone noise signal (404); determining a difference between the geophone normalized value and the hydrophone normalized value, the difference defining the normalized relative noise signal (405); creating a reflected seismic wavefield in a water environment (406); obtaining a geophone data signal for the geophone that represents waves from the reflected seismic wavefield (407); obtaining a hydrophone data signal for the hydrophone that represents waves from the reflected seismic wavefield (408); scaling the geophone and hydrophone data signals by a scale amount equal to the normalized relative noise signal (409); and combining the scaled geophone and hydrophone data signals together to form a combined signal trace (410).

Another example embodiment comprises a method of processing data from a co-located hydrophone-geophone pair of seismic receivers in an ocean-bottom cable, wherein the data comprises: a geophone signal and a hydrophone signal for a pair; a geophone noise signal for the pair representing ambient noise for the geophone; a hydrophone noise signal for the pair representing ambient noise for the hydrophone; a geophone data signal for the geophone; and a hydrophone data signal for the hydrophone. The process comprises: determining a normalized relative noise signal, representing the difference between the geophone noise signal and the hydrophone noise signal; and scaling data signals by a scale amount equal to the normalized relative noise signal.

According to some embodiments, the normalizing comprises some statistical or mathematical function such as Root Mean Square, average or mean.

According to some embodiments, the scaling comprises, alternatively, adding the difference to the geophone data signal, adding the difference to the hydrophone data signal, or adjustment of both the hydrophone data signal and the geophone data signal by a relative amount equal to the difference.

According to still further embodiments, obtaining of the geophone noise signal is of at least 1 minute of geophone-received noise, and obtaining of the hydrophone noise signal is of at least 1 minute of hydrophone-received noise.

According to alternative embodiments, 10 minutes and 20 minutes are also used. It has been found that long ambient noise recording reduces the amount of adjustment required to compensate for the fact that the hydrophone is omnidirectional, while the geophone has a conical response characteristic.

According to still a further embodiment, wherein multiple hydrophone-geophone pairs are used in a seismic cable, multiple relative noise signals are determined, whereby not every pair is scaled an equivalent amount. And, according to still a further embodiment, separate relative noise signals are determined for each of the pairs.

For a single passive recording of seismic in-situ noise, a root mean square average is computed, according to one embodiment, as follows:

$$A=((\Sigma a_i^2)/i)^{1/2} (i=1, \text{(record length)}/\text{(sample rate)})$$

Where A is the root mean square amplitude of a time series consisting of "i" amplitudes "a."

A typical seismic recording consists of 1000 to 10000 amplitude samples for each channel. The samples each represent a time interval of from 1 milliseconds to 4 milliseconds. The entire recordings represent a "listen" time of from 2 seconds to 10 seconds, normally. Thus, a 6 second record length at a 2 millisecond sample rate would contain 3000 samples. Since an in-situ recording of noise requires much longer listen times than most seismic instruments are capable of, multiple recordings are averaged, according to one embodiment, as follows:

$$A=((\Sigma((\Sigma a_i^2)/i)^{1/2})/k)^{1/2} \text{ or } A=((\Sigma A_k^2)/k)^{1/2} (i=1, \text{(record length)}/\text{(sample rate)}), (k=1, \text{(number of recordings)})$$

The number of recordings typically totals to about 15 minutes for listen time, according to this embodiment. That is, with 6 seconds recordings, the total would be about 150. Therefore, this average is computed on both the hydrophone and geophone channels for each receiver group. $A_h$ is the root mean square amplitude of the in-situ hydrophone passive recording. $A_g$ is the root mean square amplitude of the in-situ geophone passive recording.

A summation of the hydrophone and geophone reflection data may be achieved by operating on the geophone and/or the hydrophone reflection data. One such operator could be a constant C where the each sample of the geophone reflection data is multiplied by:

$$C=A_h/A_g$$

Then, the result is added to each corresponding sample of the hydrophone signal. Thus, for:

$$F(h)=(h_1,h_2,h_3, \ldots h_i) \text{ and } F(g)=(g_1,g_2,g_3, \ldots g_i),$$

where F(h) and F(g) are the data signals for the hydrophone and geophone, respectively. The summed data is:

$$F(s)=(h_1+(Cxg_1), h_2+(Cxg_2), \ldots (h_i+(Cxg_i))$$

In an additional embodiment, a directivity factor D is incorporated such that:

$$C=((D \times A_h)/A_g)$$

wherein D effectively attenuates the amplitude of the hydrophone average to account for the omni-directive nature of hydrophones compared to vertical directivity of geophones.

We claim:

1. A method of processing data from a co-located hydrophone-geophone pair of seismic receivers, the method comprising:

obtaining a geophone noise signal that represents ambient noise for the geophone;

obtaining a hydrophone noise signal that represents ambient noise for the hydrophone;

generating a normalized relative noise signal that is the normalized difference between the geophone noise signal and the hydrophone noise signal; and adjusting the relative amplitude between the data from the hydrophone and the data from the geophone by a function dependant upon the normalized relative noise signal.

2. A method as in claim 1 further comprising:

creating a reflected seismic wavefield in a water environment;

obtaining a geophone data signal for the geophone that represents waves from creating a reflected seismic wavefield;

obtaining a hydrophone data signal for the hydrophone that represents waves from creating a reflected seismic wavefield; and wherein the adjusting comprises multiplying at least one of the hydrophone data signal or the geophone data signals by a value, and combining the multiplied geophone and hydrophone data signals together to form a combined signal trace, wherein the combining comprises a linear combination of the hydrophone and geophone data.

3. A method as in claim 1 wherein the generating a normalized relative noise signal comprises:

determining a geophone RMS value of the geophone noise signal;

determining a hydrophone RMS value of the hydrophone noise signal; and determining a difference between the geophone RMS value and the hydrophone RMS value, the difference defining the normalized relative noise signal.

4. A method as in claim 1 wherein the generating a normalized relative noise signal comprises:

determining a difference between the geophone noise signal and the hydrophone noise signal; and determining a RMS value for the difference, whereby the normalized relative noise signal is defined.

5. A method as in claim 1 wherein the generating a normalized relative noise signal comprises:

determining a geophone average value of the geophone noise signal;

determining a hydrophone average value of the hydrophone noise signal; and determining a difference between the geophone average value and the hydrophone average value, the difference defining the normalized relative noise signal.

6. A method as in claim 1 wherein the generating a normalized relative noise signal comprises:

determining a difference between the geophone noise signal and the hydrophone noise signal; and determining an average value for the difference, whereby the normalized relative noise signal is defined.

7. A method as in claim 1 wherein the generating a normalized relative noise signal comprises:

determining a geophone mean value of the geophone noise signal;

determining a hydrophone mean value of the hydrophone noise signal; and determining a difference between the geophone mean value and the hydrophone mean value, the difference defining the normalized relative noise signal.

8. A method as in claim 1 wherein the generating a normalized relative noise signal comprises:

determining a difference between the geophone noise signal and the hydrophone noise signal; and determining a mean value for the difference, whereby the normalized relative noise signal is defined.

9. A method as in claim 2 wherein the obtaining a geophone data signal is recording a geophone data signal.

10. A method as in claim 2 wherein the obtaining a hydrophone data signal is recording a hydrophone data signal.

11. A method as in claim 1 wherein the obtaining a geophone noise signal comprises obtaining at least 1 minute of geophone-received noise.

12. A method as in claim 1 wherein the obtaining a hydrophone noise signal comprises obtaining at least 1 minute of hydrophone-received noise.

13. A method as in claim 14 wherein the obtaining a geophone noise signal comprises obtaining at least 1 minute of geophone-received noise.

14. A method as in claim 15 wherein the obtaining a geophone noise signal comprises obtaining at least 10 minutes of geophone-received noise.

15. A method as in claim 16 wherein the obtaining a hydrophone noise signal comprises obtaining at least 10 minutes of hydrophone-received noise.

16. A method as in claim 17 wherein the obtaining a geophone noise signal comprises obtaining at least 20 minutes of geophone-received noise.

17. A method as in claim 18 wherein the obtaining a hydrophone noise signal comprises obtaining at least 20 minutes of hydrophone-received noise.

18. A method as in claim 1 wherein multiple hydrophone-geophone pairs are used in a seismic cable, and further comprising generating multiple normalized relative noise signals and further comprising scaling data signals by multiple scale amounts equal to the multiple normalized relative noise signals whereby not every pair is scaled an equivalent amount.

19. A method as in claim 20 further comprising generating a separate normalized relative noise signal for each of the pairs and scaling separate data signals from each of the pairs by a separate scale amount equal to the separate normalized relative noise signal whereby each pair is scaled independent of other pairs.

20. A method of processing data from a co-located geophone and hydrophone pair of seismic receivers in an ocean environment, wherein the data comprises:

a geophone signal and a hydrophone signal for a pair;

a geophone noise signal for the pair representing ambient noise for the geophone;

a hydrophone noise signal for the pair representing ambient noise for the hydrophone;

a geophone data signal for the geophone; and a hydrophone data signal for the hydrophone;

the process comprising:

determining a normalized relative noise signal, representing the difference between the geophone noise signal and the hydrophone noise signal; and scaling data signals by a scale amount equal to the normalized relative noise signal.

* * * * *

UNITED STATES PATENT AND TRADEMARK OFFICE
CERTIFICATE OF CORRECTION

PATENT NO. : 5,621,699
DATED : April 15, 1997
INVENTOR(S) : Timothy B. Rigsby & Joe I. Sanders It is certified that error appears in the above-identified patent and that said Letters Patent is hereby corrected as shown below:

In claim 13, line 12, the claim reference numeral "14" should read --12--. In claim 14, line 15, the claim reference numeral "15" should read --1--. In claim 15, line 18, the claim reference numeral "16" should read --1--. In claim 16, line 21, the claim reference numeral "17" should read --1--. In claim 17, line 24, the claim reference numeral "18" should read --1--. In claim 19, line 34, the claim reference numeral "20" should read --18--.

Signed and Sealed this

Twelfth Day of May, 1998

Attest:

BRUCE LEHMAN

Attesting Officer

Commissioner of Patents and Trademarks